United States Patent [19]

Guerlet et al.

[11] Patent Number: 5,075,076

[45] Date of Patent: Dec. 24, 1991

[54] PALLADIUM-BASED ALLOYS CONTAINING TIN AND THEIR USE IN THE GLASS INDUSTRY

[75] Inventors: Jean-Paul Guerlet, Paris; Jean-Pierre Hilger, La Neuvelille, both of France

[73] Assignee: Comptoir Lyon-Alemand-Louyot, Societe Anonyme, France

[21] Appl. No.: 464,551

[22] Filed: Jan. 8, 1990

Related U.S. Application Data

[63] Continuation of Ser. No. 210,392, Jun. 23, 1988, abandoned.

[30] Foreign Application Priority Data

Jun. 26, 1987 [FR] France ................... 87 09081

[51] Int. Cl.$^5$ ................................. C22C 5/04
[52] U.S. Cl. .......................... 420/463; 65/1; 65/374.1; 65/374.12; 373/27; 373/28; 420/464; 420/465; 420/587; 420/589
[58] Field of Search ............... 420/463, 464, 645, 587, 420/588; 65/1, 374.1, 374.12; 373/27, 28

[56] References Cited

U.S. PATENT DOCUMENTS

| | | | |
|---|---|---|---|
| 3,929,474 | 12/1975 | Ingersoll | 420/463 |
| 3,989,515 | 11/1976 | Reiff | 420/464 |
| 4,124,382 | 11/1978 | Prosen | 420/463 |
| 4,149,883 | 4/1979 | Harmsen et al. | 420/464 |
| 4,179,286 | 12/1979 | Knosp | 420/463 |
| 4,382,909 | 5/1983 | Zwingmann | 420/463 |
| 4,399,096 | 8/1983 | Agarwal et al. | 420/463 |
| 4,518,564 | 5/1985 | Prasad | 420/464 |
| 4,539,176 | 9/1985 | Cascone | 420/463 |
| 4,551,302 | 11/1985 | Wagner et al. | 420/465 |
| 4,576,789 | 3/1986 | Prasad | 420/463 |

FOREIGN PATENT DOCUMENTS

| | | | |
|---|---|---|---|
| 961762 | 3/1957 | Fed. Rep. of Germany . | |
| 3146794 | 6/1983 | Fed. Rep. of Germany | 420/463 |
| 3204743 | 8/1983 | Fed. Rep. of Germany | 420/463 |
| 2349658 | 11/1977 | France . | |
| 107438 | 6/1983 | Japan | 420/465 |
| 229443 | 12/1984 | Japan | 420/463 |

*Primary Examiner*—R. Dean
*Assistant Examiner*—David W. Shumaker
*Attorney, Agent, or Firm*—Brumbaugh, Graves, Donohue & Raymond

[57] ABSTRACT

The invention relates to a novel palladium-based alloy.

This palladium-based alloy comprises tin in an amount, preferably of 5 to 20% by weight, which is sufficient to impart an acceptable resistance to corrosion by molten glass, preferably being essentially equivalent to that of platinum-rhodium 10% alloys.

An alloy of this type can be used in the glass industry for making components which come into contact with molten glass, which preferably essentially contains no oxides less stable than tin oxide, such as lead oxide, because it has an excellent resistance to corrosion by molten glass and is much less expensive than the platinum-rhodium 10% alloy normally used. Moreover, by the addition of at least one element selected from platinum (0–50% by weight), rhodium (0–20% by weight), iridium (0–20% by weight) and ruthenium 0–20% by weight), the mechanical strength at high temperature, especially the creep strength, is significantly improved.

30 Claims, No Drawings

PALLADIUM-BASED ALLOYS CONTAINING TIN AND THEIR USE IN THE GLASS INDUSTRY

This application is a continuation of application Ser. No. 210,392, filed on Jun. 23, 1988, abandoned.

The present invention relates to novel palladium-based alloys containing tin, which can be used especially in the glass industry for making components which come into contact with liquid glass, and to the use of these alloys in the glass industry.

The invention also relates to a process for the protection against corrosion of components used in the glass industry which may come into contact with molten glass, and to the components obtained by this process.

Since it first started, the glass industry has been faced with the problem of the corrosion resistance of components in contact with molten glass. In fact, the metal parts of the industrial installations operate in air and at temperatures which can vary according to the type of glass, but which are generally between 1100° C. and 1400° C. Now, there are only a very few metals which are capable of withstanding such a harsh environment by simultaneously having a good resistance to oxidation, a good resistance to corrosion by molten glass and adequate mechanical characteristics at these temperatures.

These severe constraints explain the quasisystematic use of platinum alloys in all cases where the corrosion resistance is the factor of primary importance. The fiber-drawing spinnerets for the manufacture of glass fibers are one of the best examples insofar as the three factors mentioned above, combined with strict quality criteria for the final product, are such that Pt Rh 10% to Pt Rh 20% alloys are used exclusively.

However, although the properties of platinum alloys have been recognized for a very long time for applications in the glass industry, the cost of precious metals has always restricted their use and has always been a powerful driving force in the search to develop replacement materials.

Thus several families of alloys have been studied, but these studies have not resulted in solutions which can actually be used in place of platinum-rhodium alloys.

As stainless steels do not have adequate characteristics, the studies have been directed towards the use of superalloys based on nickel-chromium, which are of the same type as those developed for the aeronautical industry. The mechanical characteristics at high temperature obtained with these alloys in recent years are remarkable, in particular the creep strength.

These characteristics are very distinctly superior to those of the conventional platinum-rhodium alloys, at least up to 1200° C., and substantially better than those of platinum alloys reinforced by a dispersion of oxides. Furthermore, the resistance to oxidation of these superalloys has been improved by the addition of very readily oxidizable elements such as, for example, aluminum. The function of these additions is to form a surface layer of oxide which protects the parent metal.

However, because of more or less substantial discontinuities in this surface layer, the protection is very imperfect. Degradation of the resistance to oxidation becomes more pronounced as the temperature increases and becomes incompatible with industrial use above 1200° C.

Moreover, the resistance of this type of alloy to corrosion by molten glasses is still very inadequate. In fact, where metal and glass are in contact, complex reactions take place between the oxides in the glass and the surface oxides. These reactions result in the disappearance of the protective layer and cause accelerated corrosion of the parent metal.

It is for this reason that, although having excellent mechanical characteristics, alloys of this type cannot be used in the glass industry when the temperature exceeds 1200° C. or when the quality criteria of the glass prohibit any pronounced corrosion of the metallic materials.

In an attempt to mitigate these major disadvantages of platinum-rhodium alloys and non-oxidizing alloys, the inventors have carried out researches on another family of replacement alloys, namely palladium-based alloys, because of the fact that, although it is a precious metal belonging to the platinoid group, palladium is considerably less expensive than platinum.

This search for palladium-based replacement alloys ran counter to the teaching of those skilled in the art, since it had hitherto been impossible to use palladium alloys in the glass industry because of the appreciable corrosion of these alloys in contact with molten glasses.

In fact, experiments show that pure palladium or palladium-platinum alloys containing up to 50% of platinum exhibit pronounced intergranular corrosion in contact with a conventional molten glass (alkali-lime glass or E glass). Surface etching of the grain boundaries can be observed after only a few dozen hours of testing. The degree of intergranular attack increases with the exposure time, causing mechanical embrittlement which is unacceptable in use.

Furthermore, although palladium oxide is not stable at high temperature (T above 800° C.), the behavior of palladium in an oxidizing atmosphere and at temperatures above 1000° C. is not totally satisfactory. In contrast to platinum, palladium has the property of dissolving an appreciable amount of oxygen when the temperature increases. This leads to internal oxidation of the various non-noble impurities contained in the parent metal. In practice, this results in embrittlement of the palladium, explaining why its ductility drops significantly at high temperature. The same phenomenon occurs in palladium-platinum alloys up to platinum contents of 50% by weight.

One object of the present invention is thus to overcome the above-mentioned disadvantages of platinum-rhodium or non-oxidizing alloys by proposing a novel family of replacement alloys which have an acceptable resistance to corrosion by molten glass, preferably being essentially equivalent to that of platinum-rhodium 10% alloys, and thus possess use characteristics essentially identical to those of the platinum-rhodium 10% alloys in general use, and whose production cost is substantially less than that of the known alloys.

Another object of the present invention is to solve the new technical problem of providing a novel family of palladium-based replacement alloys which have an acceptable resistance to corrosion by molten glass, preferably being essentially equivalent to that of platinum-rhodium 10% alloys, and which simultaneously have good mechanical properties at ambient temperature and at high temperature, and especially a good creep strength, in particular at high temperature and more particularly under industrial use conditions at 1100° C.–1400° C.

The present invention provides the first satisfactory solution to all these technical problems by proposing a novel family of alloys which can be used especially in the glass industry.

Thus, according to a first aspect, the present invention relates to a palladium-based alloy which can be used especially in the glass industry for making components which come into contact with molten glass, which is preferably a glass essentially containing no oxides less stable than tin oxide, such as lead oxide, the said alloy comprising tin in a sufficient amount to impart an acceptable resistance to corrosion by molten glass, preferably being essentially equivalent to that of platinum-rhodium 10% alloys.

In a preferred embodiment, this alloy comprises from 2 to 20% of tin, preferably from 5 to 18%, more preferably from 5 to 16% and even more preferably from 10 to 15%, by weight of tin.

In a particularly advantageous embodiment, this palladium-based alloy containing tin also comprises at least one of the following elements (amounts in percentages by weight):
platinum: 0-50
rhodium: 0-20, preferably 5-10
iridium: 0-20, preferably 5-10
ruthenium 0-20, preferably 5-10.

Furthermore, according to a particular characteristic of the invention, when platinum is present in the alloy according to the invention, it constitutes the remainder of the alloy.

In a first particular embodiment, the alloy according to the invention is a palladium-tin binary alloy.

In another embodiment, this alloy is a palladium-platinum-tin ternary alloy.

A possible alloy is a platinum 45%, palladium 40%, tin 10%, rhodium 5% alloy.

In yet another particular embodiment, this alloy is reinforced through the formation of a disperse phase by using already known processes for the production of materials containing disperse phases, whether this be structural hardening, powder metallurgy, schooping, or the like.

In another advantageous embodiment of the alloy according to the invention, it is prepared by vacuum melting.

According to a second aspect, the present invention relates to the use of these alloys in the glass industry for making components which come into contact with molten glass, which is preferably a glass essentially containing no oxides less stable than tin oxide, such as lead oxide.

According to a third aspect, the present invention relates to a process for the protection against corrosion by molten glass of components used in the glass industry, which consists in making at least some parts of the said components, especially the parts which may come into contact with molten glass, which is preferably a glass essentially containing no oxides less stable than tin oxide, such as lead oxide, of a palladium-based alloy containing tin, as defined previously.

Finally, according to a fourth aspect, the present invention relates to those components used in the glass industry which may come into contact with molten glass, of which at least some parts, especially the parts which may come into contact with molten glass, are made of a palladium-based alloy containing tin, as defined previously.

The invention is based on the discovery, which is totally surprising to those skilled in the art, that the addition of a certain amount of tin to palladium-based alloys imparts to the resulting alloys an acceptable resistance to corrosion by molten glasses, this corrosion resistance being essentially equivalent to that of platinum-rhodium 10% alloys when the tin content is between 2 and 20%.

It has been discovered that this excellent behavior is due to suppression of the intergranular corrosion observed in palladium and palladium-platinum alloys. This phenomenon is explained in the following way, although this explanation is not intended to imply a limitation.

The very readily oxidizable impurities (Al, Mg, etc.) present in the parent metal generally undergo segregation at the grain boundaries. In the presence of molten glass, some of whose oxides can be reduced by these impurities, oxidation-reduction reactions take place.

Consequently the silicon, in particular, which is released in these reactions can diffuse and form Pd-Si phases in a very localized manner at the grain boundaries, the said phases being liquid at these temperatures. These phases dissolve in the molten glass and then initiate a chain reaction of oxidation-reduction-dissolution of the Pd-Si phases, which leads to the intergranular corrosion demostrated by experimental observations.

Now, the addition of tin fundamentally modifies the reactions which occur. In this case, the impurities segregated at the grain boundaries react with the tin oxides formed in the surface layer.

Reduction of the silica contained in the glass can no longer take place and the chain reaction which caused the intergranular corrosion is suppressed.

However, it is important to note that the corrosion resistance of these alloys is only assured in glasses containing no oxides less stable than tin oxide. If this is not the case, the oxides will be reduced by the tin and the metallic elements thereby released will be able to diffuse into the grain boundaries of the metal. This occurs in particular in the case of crystal glasses containing lead oxide. The corrosion of these alloys in glasses of this type is extremely rapid, which is why it is preferable, in this use, if the glass essentially contains no oxides less stable than tin oxide, such as lead oxide.

It has also been observed, unexpectedly, that the addition of more than about 5% of tin also makes it possible to improve the behavior of these alloys according to the invention at high temperature and in air. Under industrial use conditions (1100° C.-1200° C.), external oxidation of the tin has been demonstrated. The layer of oxide formed after thirty minutes or so is continuous, with a thickness of 5 to 10 micrometers, and effectively blocks all subsequent diffusion of oxygen. It thus offers excellent protection for the matrix against generalized oxidation. Internal oxidation, at the grain boundaries, of the impurities contained in the matrix, and its effect on the hot ductility of these alloys, are therefore completely suppressed.

The mechanical characteristics of the alloys according to the invention at ambient temperature are superior to those of platinum-rhodium 10% alloys. Their ductility at ambient temperature is excellent, making it possible to perform necessary conversions under perfectly conventional conditions with no appreciable difference compared to platinum-rhodium 10% alloys. The mechanical characteristics at high temperature, and more particularly the creep strength, depend on the content of tin and any other additions.

In the range of temperatures used for the applications in the glass industry for which the alloys of the present invention are intended, the creep strength of the palladium-tin binary alloys is equivalent to that of platinum but is still lower than that of platinum-rhodium 10% alloys. However, taking into account the large differences in density and metal cost, these alloys have a very favorable characteristic ratio of creep strength to cost.

The creep strenght, which is particularly important in the case of fiber-drawing spinnerets, can be considerably improved in the alloys according to the invention by means of particular additions or conventional production processes.

For this reason, according to a particular characteristic of the invention which makes it possible to improve the mechanical strengths of the alloys according to the invention, especially the creep strength, at high temperature, the invention recommends the addition of platinoid elements (0 to 50% by weight of platinum; 0 to 20% by weight of rhodium; 0 to 20% by weight of iridium; 0 to 20% by weight of ruthenium), these additions being made together or separately.

Of course, the amounts of these elements are determined according to the desired economic advantage.

In general, the palladium content of the alloys according to the invention will be between 45 and 98%, preferably between 80 and 95%, by weight. In other words, the additions will generally represent from 2 to 55% by weight of the alloy and preferably from 5 to 20% by weight.

The alloys according to the invention can also be reinforced by means of a disperse phase. This technique is well known to those skilled in the art as already being in use in industry for a number of materials intended for high-temperature applications (superalloy, platinum-rhodium alloy). The processes which are already known for the production of materials containing disperse phases can be applied to the alloys according to the invention: structural hardening, powder metallurgy and schooping.

The invention will be illustrated in greater detail by the following Examples, which are given without limiting the scope of the invention. In the Examples, all the percentages are given by weight, unless indicated otherwise.

EXAMPLE 1

A palladium-tin alloy containing 10% by weight of tin is prepared by vacuum melting.

The ingot is hot-forged at a temperature of 1200° C. down to a thickness of 10 mm. It is then coldrolled down to 1 mm. The mechanical characteristics at ambient temperature after cold-working by 400% and after annealing for 30 min at 1150° C. are given in Table I.

Because of the absence of a high-density material such as platinum, the density of the alloy is 11.6 (i.e. 60% of that of Pt Rh 10%). These materials have excellent use characteristics in air and at high temperature. Oxidation of the tin does not significantly modify the properties of the material.

Insofar as these materials can be heated by the Joule effect when in use, the change in the resistance as a function of temperature is given in Table II.

As already mentioned, the creep properties of these materials are of great importance for their use in the glass industry. The creep strength is measured by means of tensile creep tests on flat 1 mm thick testpieces at 1000° C. and 1200° C. Furthermore, the flexural creep characteristics are determined at 1200° C. on flat testpieces of varying thicknesses (from 0.7 to 1.5 mm).

All the results of the creep tests are collated in Table III and compared with platinum and platinum-rhodium 10% alloys.

Characterization of the materials in the presence of molten glass was carried out by means of three behavior tests:

a static test of corrosion by molten glass at constant temperature (1200° C.) for periods of 100 to 500 hours. In this test, a plate of the material is immersed in liquid glass, the whole being at the appropriate temperature in a furnace. After the test, macrographic and micrographic observations make it possible to assess any coloration of the glass and the corrosion phenomena in the molten glass and at the metal/molten glass/air interface. The Pd Sn 10% alloy tested under these conditions up to 500 hours at 1200° C. caused no coloration of E glass. That part of the metal which was immersed in the glass shows no corrosion. As regards the metal/molten glass/air interface, slight etching is apparent after the test. The micrographic observations show that there is slight corrosion at the grain boundaries to a depth not exceeding 10 $\mu$m. A sample of palladium tested under the same conditions shows very substantial intergranular corrosion penetrating several hundred microns into the material;

a test of corrosion in the presence of molten glass on a plate heated by the Joule effect. It is a very generalized practice in the glass industry to heat the spinnerets by the Joule effect.

Any influence of the electric current on the corrosion by molten glass is therefore studied by this type of test. The test is carried out by heating a 0.5 mm thick plate by means of an alternating current at a current density of 40 mA/cm$^2$. A small amount of glass is placed on the plate and is melted when the plate heats up.

The temperature is measured by a thermocouple immersed in the liquid glass. The test is carried out at two temperatures (1200° C. and 1350° C.) for a period of 72 h.

The general conditions of the tests (current density, temperature) were chosen to represent the use conditions in the glass industry. Because the heat losses are substantially greater in the test than in industrial use, the current density is also fairly substantially higher than that normally employed in industry. This makes the test even more severe. The Pd Sn 10% alloy tested under these conditions did not show detectable corrosion: no coloration of the glass, no corrosion in the zone in contact with the molten glass and slight corrosion, of the same type as before, at the triple interface. The test shows that the material does not exhibit electrochemical corrosion caused by the electric current used for heating;

a prototype behavior test. This test is carried out on a crucible with a capacity of about 500 cm$^3$. The bottom of the crucible consists of a spinneret enabling the glass to be drawn into fibers. The overall behavior of the material, assessed by way of the operating conditions of the installation and an expert's report after the test, was satisfactory.

The alloy which has just been described represents the best embodiment of the invention from the technicoeconomic point of view.

EXAMPLE 2

A palladium-tin alloy containing 15% by weight of tin is prepared by vacuum melting.

The ingot is hot-forged at a temperature of 1200° C. down to a thickness of 10 mm. It is then cold-rolled down to 1 mm. The mechanical characteristics at ambient temperature after cold-working by 400% and after annealing for 30 min at 1150° C. are given in Table I.

The creep strength of this alloy, measured on flat 1 mm thick test-pieces, is given in Table III and compared with platinum and platinum-rhodium 10% alloys.

The tests of corrosion in E glass and alkalilime glass were carried out at 1200° C. for 16 days. The samples showed no signs of corrosion after the tests. Palladium tested under the same conditions showed very pronounced intergranular attack.

EXAMPLE 3

A palladium-tin-rhodium alloy containing 15% by weight of tin and 5% of rhodium is prepared by vacuum melting. This alloy is converted and tested under the same conditions as in Example 1.

The mechanical characteristics in the cold (Table I) and the creep strength (Table IV) show the influence of the addition of rhodium.

EXAMPLE 4

A platinum-palladium-tin alloy containing 40% by weight of palladium and 10% by weight of tin is prepared by vacuum melting. This alloy is converted and tested under the same conditions as in Example 1.

The addition of a large amount of platinum only slightly modifies the mechanical characteristics in the cold. On the other hand, there is a significant increase in the creep strength (Table IV). The tests of corrosion in molten glass, carried out as in Example 1, showed the absence of any corrosion. It is important to note that the Pt-Pd alloy containing 50% by weight of platinum, tested under the same conditions, shows appreciable incipient corrosion.

EXAMPLE 5

A platinum-palladium-tin-rhodium alloy having the composition Pt 45%, Pd 40%, Sn 10%, Rh 5% by weight is prepared by vacuum melting. Because it has a substantial hardness, this alloy requires a different conversion range from that used for the previous Examples.

The ingot is hot-forged at a temperature of 1200° C. down to a thickness of 10 mm. It is cold-rolled down to 8 mm, annealed for 30 min at 1150° C., quenched with water and finally cold-rolled down to 1 mm.

The mechanical characteristics are appreciably improved by the addition of rhodium, both at ambient temperature (Table I) and at high temperature (Table IV).

EXAMPLES 6 TO 15

A series of palladium-based alloys having the compositions collated in Table (V) are prepared by vacuum melting.

The ingots are hot-forged at a temperature of 1200° C. down to a thickness of 10 mm. They are then cold-rolled down to 1 mm. The creep strength of the alloys is measured on flat 1 mm thick test-pieces. The characteristics of these various alloys are indicated in the Table. These values show the improvement in creep strength which is brought about by the additions, more particularly of rhodium and ruthenium.

Tests of corrosion in E glass are carried out at 1200° C. for 100 h. After the tests, the samples are observed under a microscope and show no detectable signs of corrosion.

The alloys according to the invention which have just been described can be employed to make components used in the glass industry and to protect them against corrosion by molten glass. With this in mind, it is easy to see that at least some parts of these components, especially the parts which may come into contact with molten glass, which is preferably a glass essentially containing no oxides less stable than tin oxide, such as lead oxide, should be made of an alloy of the type defined above.

In particular, the alloys according to the invention have the property of being able to be joined to conventional Pt Rh 10% alloys using techniques commonly employed by those skilled in the art, for example inert gas welding, (TIG welding).

Consequently, in a currently preferred embodiment of the invention, it is possible to make components for use in the glass industry in which only part of the whole is made of Pt Rh 10% alloy. This partial substitution makes it possible to optimize the compromise between the mechanical characteristics at high temperature and the cost of the materials in the most advantageous manner.

It should also be noted that the alloys according to the invention have the particular property of being "self-welding", i.e. each alloy can be welded to itself. Consequently, the alloys of the invention can be used to manufacture welded components.

TABLE I

| | MECHANICAL CHARACTERISTICS AT 20° C. | | | | | | | |
|---|---|---|---|---|---|---|---|---|
| | COLD-WORKED BY 400% | | | | ANNEALED | | | |
| | $R_m$ (daN/mm$^2$) | $R_p$ 0.2 (daN/mm$^2$) | A % | $HV_5$ (daN/mm$^2$) | $R_m$ (daN/mm$^2$) | $R_p$ 0.2 (daN/mm$^2$) | A % | $HV_5$ (daN/mm$^2$) |
| Pt | 35 | | 1 | 105 | 12 | | 32 | 40 |
| Pt Rh 10 | 53 | 53 | 1 | 185 | 29 | 13 | 30 | 88 |
| Pd Sn 10 | 78 | 75 | 1 | 230 | 39 | 21 | 35 | 96 |
| Pd Sn 15 | 112 | 97 | 1 | 320 | 56 | 26 | 41 | 120 |
| Pd Sn 15 Rh 5 | 123 | 120 | 1 | 360 | 69 | 47 | 22 | 180 |
| Pt Pd 40 Sn 10 | 116 | 109 | 1 | 355 | 57 | 21 | 53 | 145 |
| Pt Pd 40 Sn 10 Rh 5 | | | | 380 | | | | 200 |

TABLE II

RESISTIVITY AS A FUNCTION OF TEMPERATURE
(μΩ · cm)
($10^{-8}$ Ω · m)

| | T | | | | | | | |
|---|---|---|---|---|---|---|---|---|
| | 500 | 600 | 700 | 800 | 900 | 1000 | 1100 | 1200 |
| Pt | 27.9 | 31.2 | 34.3 | 37.4 | 40.3 | 43.1 | 45.8 | 48.4 |

TABLE II-continued
RESISTIVITY AS A FUNCTION OF TEMPERATURE
(μΩ · cm)
($10^{-8}$ Ω · m)

| | T | | | | | | | |
|---|---|---|---|---|---|---|---|---|
| | 500 | 600 | 700 | 800 | 900 | 1000 | 1100 | 1200 |
| Pt Rh 10% | 33.1 | 35.8 | 38.5 | 41.1 | 43.6 | 46.1 | 48.5 | 50.8 |
| Pd Sn 15% | 48.0 | 50.4 | 52.8 | 56.0 | 58.8 | 61.2 | 64.4 | 67.2 |
| Pd Sn 10% | 43.7 | 45.8 | 48.0 | 50.6 | 52.9 | 55.1 | 57.8 | 60.0 |

TABLE III
CREEP STRENGTH AT HIGH TEMPERATURE

| | Tensile creep strength[1] | | | | Flexural creep strength 1200° C. · 24 h | |
|---|---|---|---|---|---|---|
| | 1000° C. | | 1200° C. | | | |
| | 1 h | 10 h | 1 h | 10 h | $V_D$ (mm/h)[2] | Kep[3] |
| Pt | 17 | 12 | — | — | — | — |
| Pt Rh 10% | 54 | 38 | 32 | 20 | 0.015 | 1 |
| Pd Sn 15% | 17 | 8 | 10 | 4 | 0.210 | 1.9 |
| Pd Sn 10% | — | — | 8 | 4.5 | 0.060 | 1.6 |

[1]load for a rupture time of 1 h or 10 h under the test conditions (in N/mm²)
[2]deformation rate in a flexural creep test (constant deformation stage) under a stress of 0.3 daN/mm²
[3]thickness multiplication factor giving a deformation rate equivalent to Pt Rh 10%

TABLE IV
CREEP STRENGTH AT HIGH TEMPERATURE

| | Creep strength at 1000° C. load for a rupture time of | | Creep strength at 1200° C. load for a rupture time of | |
|---|---|---|---|---|
| | 1 h (N/mm²) | 10 h (N/mm²) | 1 h (N/mm²) | 10 h (N/mm²) |
| Pt | 17 | 12 | — | — |
| Pt Rh 10 | 54 | 38 | 32 | 20 |
| Pd Sn 15 | 17 | 8 | 10 | 4 |
| Pd Sn 15 Rh 5 | 23 | 13 | 12 | 6 |
| Pt Pd 40 Sn 10 | 28 | 17 | 12 | 6.5 |
| Pt Pd 40 Sn 10 Rh 5 | 32 | 22 | | |

TABLE V

| | Creep rupture time (h) | | | |
|---|---|---|---|---|
| | 1000° C. | | 1200° C. | |
| | σ = 16 N/mm | σ = 20 N/mm | σ = 6 N/mm | σ = 10 N/mm |
| Pd Sn 5 | 4.3 | 2.4 | 8 | 1 |
| Pd Sn 10 | — | — | 3 | 0.4 |
| Pd Sn 15 | 1.6 | 0.7 | 1.7 | 0.2 |
| Pd Sn 10 Rh 5 | 4.8 | 2.1 | 10 | 1 |
| Pd Sn 10 Rh 10 | — | — | — | 7.5 |
| Pd Sn 10 Ir 5 | — | — | — | 2.3 |
| Pd Sn 10 Ir 10 | — | — | — | 1.8 |
| Pd Sn 10 Ru 5 | — | — | — | 2.6 |
| Pd Sn 10 Ru 10 | — | — | — | 1.9 |
| Pd Sn 10 Rh 10 Ru 1 | — | — | — | 1.4 |
| Pd Sn 10 Rh 10 Ru 5 | — | — | — | 0.6 |
| Pd Sn 10 Rh 10 Ir 5 | — | — | — | 7.3 |

What is claimed is:

1. A spinneret for contacting molten glass free from oxides less stable than tin oxide, in a glass processing installation, a part of said spinneret that contacts said molten glass being fabricated from an alloy selected from the group consisting of binary alloys of palladium and tin and alloys consisting essentially of palladium, tin and at least one metal selected from the group consisting of platinum, rhodium, iridium and ruthenium, wherein the amount of tin present in the selected alloy is from about 2.0% to 20.0% by weight and the amount of palladium is not less than about 40.0% by weight, wherein the part of said spinneret has a resistance to corrosion by said molten glass substantially the same as that of platinum-rhodium 10% alloys.

2. The spinneret according to claim 1 fabricated from an alloy containing 5.0% to 18.0% by weight tin.

3. The spinneret according to claim 1 fabricated from an alloy containing 10.0% to 15.0% by weight tin.

4. The spinneret according to claim 1 fabricated from an alloy containing up to 50.0% by weight platinum.

5. The spinneret according to claim 1 fabricated from an alloy containing up to 20.0% by weight of a metal selected from the group consisting of rhodium, iridium, and ruthenium.

6. The spinneret component according to claim 1 fabricated from an alloy containing, by weight, 40.0% palladium, 10.0% tin, 45.0% platinum and 5.0% rhodium.

7. The spinneret according to claim 1 fabricated from an alloy containing, by weight, 90.0% palladium and 10.0% tin.

8. The spinneret according to claim 1 fabricated from an alloy containing, by weight, 80.0% palladium, 10.0% tin and 10.0% ruthenium.

9. An alloy having a resistance to corrosion by molten glass which is free from oxides less stable than tin oxide, comprising, by weight, 45.0% platinum, 40.0% palladium, 10.0% tin and 5.0% rhodium.

10. An alloy having a resistance to corrosion by molten glass which is free from oxides less stable than tin oxide, comprising, by weight, 80.0% palladium, 10.0% tin and 10.0% ruthenium.

11. A process for protecting a spinneret used in a glass processing installation against corrosion by molten glass free from oxides less stable than tin oxide, comprising fabricating a part of the spinneret which contacts said molten glass from an alloy selected from the group consisting of binary alloys of palladium and tin and alloys consisting essentially of palladium, tin and at least one metal selected from the group consisting of platinum, rhodium, iridium and ruthenium, wherein the amount of tin present in the selected alloy is from about 2% to 20% by weight and the amount of palladium is not less than about 40% by weight.

12. The process according to claim 11 wherein the amount of tin present in the alloy is 5.0% to 18.0% by weight.

13. The process according to claim 11, wherein the amount of tin in the alloy is 10.0% to 15.0% by weight.

14. The process according to claim 11, wherein the alloy further contains up to 20% by weight of a metal selected from the group consisting of rhodium, iridium, and ruthenium.

15. The process according to claim 11, wherein the alloy contains, by weight, 40.0% palladium, 10.0% tin, 45.0% platinum and 5.0% rhodium.

16. The process according to claim 11, wherein the alloy contains, by weight, 90.0% palladium and 10.0% tin.

17. The process according to claim 11, wherein the alloy contains, by weight, 80.0% palladium, 10.0% tin and 10.0% ruthenium.

18. An apparatus for processing glass, comprising at least one spinneret that comes into contact with molten glass during said processing, said spinnerets being fabricated from an alloy selected from the group consisting of binary alloys of palladium and tin and alloys consisting essentially of palladium, tin and at least one metal selected from the group consisting of platinum, rhodium, iridium and ruthenium, wherein the amount of tin present in the selected alloy is from about 2% to 20% by weight and the amount of palladium is not less than about 40% by weight, wherein said spinneret has a resistance to corrosion by the molten glass substantially the same as that of platinum-rhodium 10% alloys.

19. The apparatus according to claim 18, wherein the spinnerets is fabricated from an alloy containing 5.0% to 18.0% by weight tin.

20. The apparatus according to claim 18, wherein the spinneret is fabricated from an alloy containing 10.0% to 15.0% by weight tin.

21. The apparatus according to claim 18, wherein the spinneret is fabricated from an alloy containing up to 50.0% by weight platinum.

22. The apparatus according to claim 18, wherein the spinneret is fabricated from an alloy containing up to 20.0% by weight of a metal selected from the group consisting of rhodium, iridium and ruthenium.

23. The apparatus according to claim 18, wherein the spinneret is fabricated from an alloy containing, by weight, 40.0% palladium, 10.0% tin, 45.0% platinum and 5.0% rhodium.

24. The apparatus according to claim 18, wherein the spinneret is fabricated from an alloy containing, by weight, 90.0% palladium and 10.0% tin.

25. The apparatus according to claim 18, wherein the spinneret is fabricated from an alloy containing, by weight, 80.0% palladium, 10.0% tin and 10.0% ruthenium.

26. A spinneret fabricated at least in part from an alloy selected from the group consisting of binary alloys of palladium and tin and alloys consisting essentially of palladium, tin and at least one metal selected from the group consisting of platinum, rhodium, iridium and ruthenium, wherein the amount of tin present in the selected alloy is from about 2% to 20% by weight and the amount of palladium is not less than about 40% by weight.

27. A metal component for contacting molten glass free from oxides less stable than tin oxide in a glass processing installation, a part of said metal component that contacts said molten glass being fabricated from an alloy, containing, by weight 40% palladium, 10% tin, 45% platinum and 5% rhodium.

28. A metal component for contacting molten glass free from oxides less stable than tin oxide in a glass processing installation, a part of said metal component that contacts said molten glass being fabricated from an alloy, containing, by weight 80% palladium, 10% tin and 10% ruthenium.

29. A process for protecting a metal component using in a glass processing installation against corrosion by molten glass free from oxides less stable than tin oxide comprising fabricating a part of the component which contacts said molten glass from an alloy containing 40% palladium, 10% tin, 45% platinum and 5% rhodium.

30. A process for protecting a metal component using in a glass processing installation against corrosion by molten glass free from oxides less stable than tin oxide comprising fabricating a part of the component which contacts said molten glass from an alloy containing 80% palladium, 10% tin and 10% ruthenium.

* * * * *